Dec. 8, 1953  A. B. STARKS-FIELD  2,662,198
SAW TOOTH WAVE CIRCUITS
Filed Aug. 20, 1951  2 Sheets-Sheet 1

Inventor:
Alfred Benjamin Starks-Field;
By his attorneys,
Baldwin & Wight

Patented Dec. 8, 1953

2,662,198

UNITED STATES PATENT OFFICE 2,662,198

SAW-TOOTH WAVE CIRCUITS

Alfred Benjamin Starks-Field, Chelmsford, England, assignor to Marconi's Wireless Telegraph Company Limited, London, England, a company of Great Britain Application August 20, 1951, Serial No. 242,731

Claims priority, application Great Britain September 1, 1950

9 Claims. (Cl. 315—27)

1

This invention relates to saw tooth wave circuits suitable for use for the production of saw tooth current waves for electro-magnetic deflection of television and similar cathode ray tubes. More specifically the invention relates to saw tooth wave circuits of the kind in which, in order to prevent the production of a damped oscillatory wave train during the "flyback" time of the saw tooth, a damping valve is provided and automatically rendered conductive at the proper times to damp out such oscillatory wave trains. For the sake of brevity saw tooth wave circuits of the kind referred to will herein be termed "damper valve saw tooth circuits."

Figure 2:
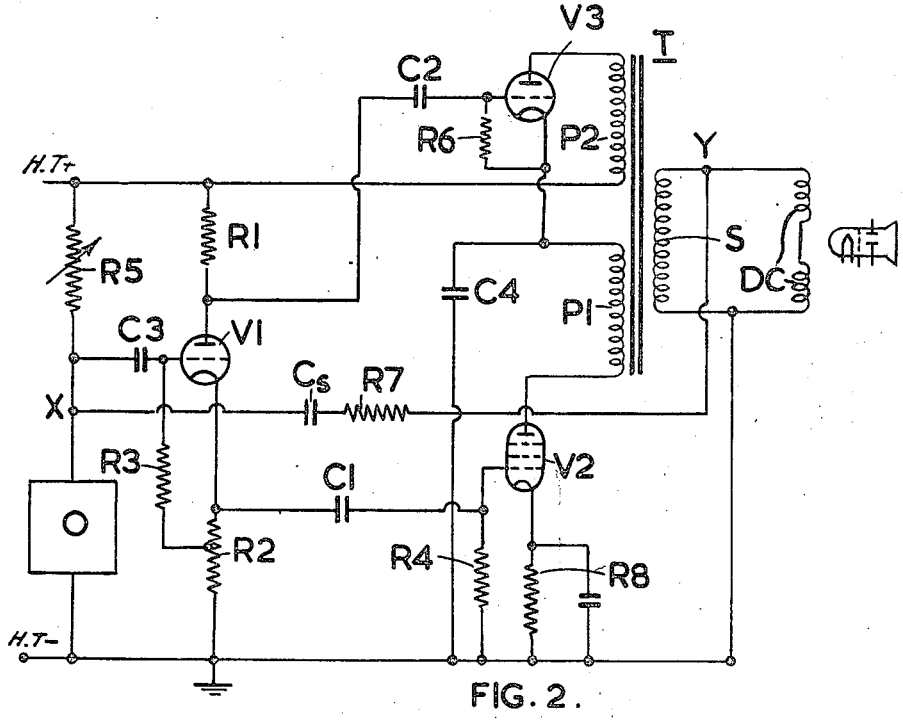
Figure 3:
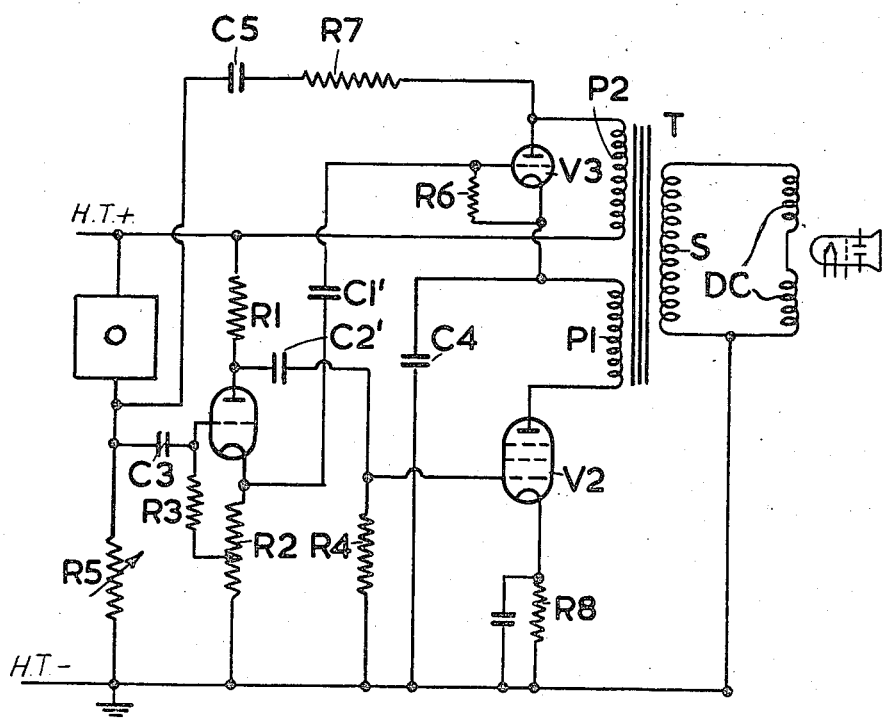

The object of the invention is to provide circuit arrangements for the stabilized operation of saw tooth oscillator systems as set forth more fully in the specification hereinafter following by reference to the accompanying drawings in which:

Figures 1(a) and (b) are curve diagrams showing the characteristic requirements for the saw tooth current wave in the deflection circuits of cathode ray television tube circuits;

Fig. 2 is a circuit diagram of a circuit arrangement embodying my invention; and Fig. 3 is a circuit arrangement of a modified form of my invention.

Figure 1:
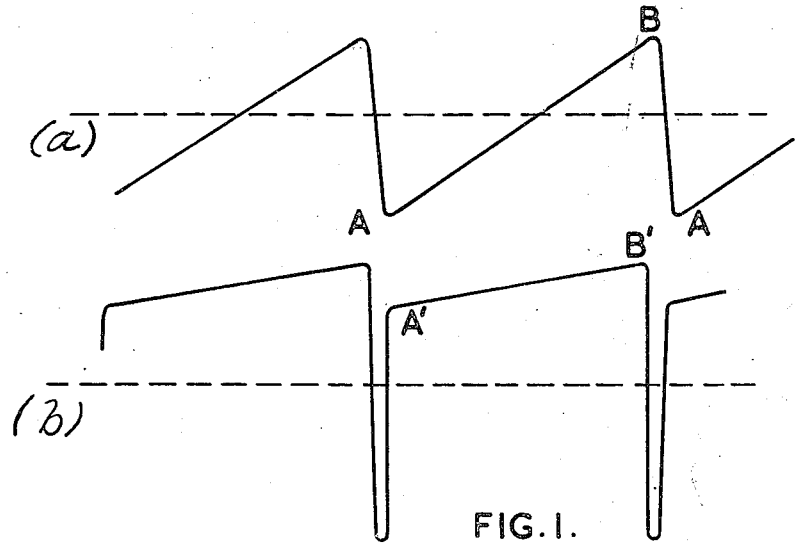

As is well known the usual requirement for a saw tooth current wave for electro-magnetic deflection of a cathode ray television tube is that the saw tooth shall be of the general form indicated in Fig. 1(a) with the rising part A to B as straight as possible and the fly-back part B to A occurring in the required fly-back time, though the wave shape here is not of much importance. With a high frequency saw tooth such as is generally required in television (e. g. a saw tooth repetition frequency of the order of 10000c/s) the voltage across the deflector coils is largely that due to their inductance and the voltage wave form required to produce a straight saw tooth current wave form as shown at (a) in Fig. 1 is as shown at (b) in Fig. 1. In each cycle this wave form rises sharply to a value at A' determined by the inductance of the deflector coils, then rises rectilinearly to B' with a small slope determined by the resistance of the coils (this rising part A' to B' corresponds to the rising part A to B of the current saw tooth of Fig. 1(a)) and then falls away sharply at the beginning of the fly-back period, the cycle recommencing at the end of the fly-back period. Where, as is customary for impedance matching purposes the coils are fed through a transformer, the voltage and current

2 waves required at the transformer primary are substantially those above described.

It will be appreciated that if, at the end of the rising part of a saw tooth current wave, the drive current to the coils is suddenly cut off, then owing to energy in the magnetic field then threading and surrounding the coils and to the existence of coil stray capacity, a damped oscillatory train will be initiated. This is obviously objectionable and it is well known accordingly to provide a damping valve which is rendered conductive at the beginning of the scan to ensure a linear decay of current. It is also known, in damper valve saw tooth circuits, to provide a reservoir condenser into which the energy recovered by the damper valve is passed and to use this energy to "boost" the high tension voltage to the driving valve. The present invention has for its object to provide improved damper valve saw tooth circuits wherein negative feed back is applied to produce linearization of the saw tooth current wave.

According to this invention a damper valve saw tooth circuit arrangement comprises a linearizing negative feed back path so connected as to be operative when either or both of the driving and damper valves is or are in operation, the control of the driving and damper valves being effected from opposite sides of a phase splitting valve preceding them and in turn controlled by the normally provided timing oscillator, the negative feed back being applied to the grid of said phase splitting valve.

Referring to Fig. 2 the valve V1 forms part of a phase splitting stage and has its anode connected to HT+ through a resistance R1 and its cathode connected to HT— and earth through a resistance R2. The cathode of V1 is also connected through a coupling condenser C1 to the control grid of a driver valve V2 the anode of V1 being connected through a further condenser C2 to the control grid of a damper valve V3. A timing pulse oscillator O is connected to the grid of the phase splitting valve V1 through a condenser C3. R3 and R4 indicate grid resistances for the valves V1 and V2 respectively the former being tapped as shown on the cathode leg resistance R2. An amplitude controlling adjustable resistances R5 is connected between the live terminal of the oscillator O and high tension terminal HT+. The cathode of the damper valve V3 is connected to the anode of the driver valve V2 through the primary winding P1 of a transformer T and the anode of said valve V3 is connected through a second primary winding P2 of the same transformer to the high tension terminal HT+. The cathode of the damper valve V3 is also connected through a condenser C4 to earth a grid resistance R6 being provided between grid and cathode of the valve V3. The output secondary S of the transformer is connected across the deflecting coils DC of the cathode ray tube (not shown) and is earthed at one end, the other end, for convenience referred to as Y, being connected through a third resistance R7 and condenser C5 in series to the live terminal of the oscillator O. This point is marked X in Fig. 2. A capacity bypassed resistance R8 connects the cathode of the driver valve V2 to earth.

If the voltage gain through the resistance R2, driver valve V2 and transformer is made equal to that via the resistance R1, damper valve V3 and transformer, the voltage on the grid of the phase splitting valve V1 will control equally the damper or driver valve, whichever is in operation.

The operation of the circuit will be considered from the end of the scan, when the driver valve is conducting, its grid voltage being somewhere in the region of its cathode voltage. The timing pulse oscillator O—which may be a blocking oscillator of known type—conducts, causing point X to be drawn negative thereby cutting off the current through the driver valve V2 owing to the cathode follower action of valve V1. This will cause the current through the secondary winding S and coils DC to execute slightly more than half a cycle of free oscillation. During this period the anode voltage of the driver valve V2 and therefore the point Y will swing violently positive to cause a charging current to flow through the resistance R7 into the condenser C5 which will acquire a charge dependent on the voltage and on the time constant provided by the elements R7 and C5. At the same time the anode voltage of the damper valve V3 will swing violently negative with the result that the said damper valve will be unable to conduct during this period. Since the point X is held negative the anode of the driver valve V2 and the grid of the damper valve V3 will be held positive. In this condition the damper valve is in condition to conduct as soon as its anode becomes positive.

As the end of this positive swing of the point Y, the timing oscillator will cut off and release the point X whose potential will now depend entirely on the application thereto of a certain amount of negative potential by way of the feed back circuit comprising the resistance R7 and the condenser C5 which will have acquired a certain amount of negative charge.

The fact that the amplitude control resistance R5 is connected to the positive terminal of the high tension source now causes the voltage at X i. e. the grid voltage of the phase splitting valve V1, to rise positively. By this time the anode of the damper valve V3 will be positive and the said valve will be conducting. As the voltage at point X rises positively, the voltage at the anode of the valve V1 will fall as will also that at the grid of the damper valve V3. Thus the current through the latter valve will decrease. The voltage at the grid of the driver valve V2 will be rising, though it will be still beyond cut-off. Slightly less than half way through the scan the current through the damper valve V3 will have fallen to zero and the damper and driver valves will be at cut-off. The remainder of the scan is effected by the rise in voltage on the grid of the driver valve V2, and the consequential increase in current through this valve, until the timing pulse oscillator again conducts when the whole process is repeated. Any departure from the ideal current wave form will be offset by the fact that the resulting change in voltage across the deflector coils via the feed back circuit will be opposite to the change causing the departure.

In a modification, instead of effecting feed back from the point Y it may be effected from the anode of the driver valve V2 the elements R7 and C5 being then in series between the anode of valve V2 and point X, the connection shown in Fig. 1 between R7 and the point Y being of course omitted.

This results in a somewhat more effective feed back circuit through it has the defect that the ohmic loss through the said feed back circuit tends to be greater.

A still further modification is shown in Fig. 3 in which feed back is effected from the anode of the damper valve V3. As will be apparent from Fig. 3 the relative positions of the timing pulse oscillator O and amplitude control resistance are reversed as compared to Fig. 1 and the cathode of the phase splitting valve V1 is coupled through condenser C1' to the grid of the damper valve V3, instead of to that of the driver valve, while the anode of the said phase splitting valve V1 is coupled through condenser C2' to the grid of the driver valve V2, instead of to that of the damper valve. The feed back circuit R7, C5 is connected between the anode of the damper valve V3 and the point of juncture of the timing pulse oscillator O and amplitude control resistance R5. The operation of this circuit is similar to that of Fig. 1 except that the grids of the damper and driver valves respectively are driven from the opposite load resistances R1, R2 of the phase splitting valve, whose voltage falls during the scan and is raised, for the fly back, by the timing pulse oscillator.

I claim:

1. In a saw tooth wave circuit for electro-magnetic deflection of a cathode ray tube, a cathode ray tube having a deflection circuit, a source of timing oscillations, a phase splitting valve circuit including a valve having at least a cathode, a control grid and an anode with said control grid controlled by oscillations from said source, a driver valve including at least a cathode, a control grid and an anode, an anode circuit connected with said last mentioned anode, said anode circuit being connected to supply electro-magnetic deflection current to said deflection circuit for said cathode ray tube when said driver valve is conductive, said driver valve having the control grid thereof connected to one side of said phase splitting valve circuit, a damping valve connected to apply damping in the electro-magnetic deflection current circuit when said damping valve is conductive, said damping valve having at least a cathode, a control grid and an anode with the control grid thereof connected to the opposite side of said phase splitting valve circuit and a linearizing feed back path connected to apply negative feed back at the control grid of said phase splitting valve when neither said driver nor said damping valve is conductive.

2. Apparatus as claimed in claim 1 wherein the input end of said linearizing feed back path is supplied from the saw tooth current wave output circuit.

3. Apparatus as claimed in claim 1 wherein the input end of said linearizing feed back path is supplied from the anode of said driver valve.

4. Apparatus as claimed in claim 1 wherein the input end of said linearizing feed back path is supplied from the anode of said damper valve.

5. Apparatus as claimed in claim 1 wherein said linearizing feed back path comprises resistance and capacity in series.

6. A saw tooth wave circuit as set forth in claim 1, including an output transformer having a pair of primary windings and a secondary winding, said deflection circuit of said cathode ray tube being connected with the outputs of said secondary winding and said driver valve and said damping valve being connected respectively with said primary windings, and said linearizing feed back path being connected with a point located between said secondary winding and said deflection circuit.

7. A saw tooth wave circuit as set forth in claim 1 in which the control grid of the damping valve is connected to the anode of said phase splitting valve through a condenser.

8. A saw tooth wave circuit as set forth in claim 1 in which said deflection circuit is connected at one side with the cathode of said driver valve and on the other side with the input end of said linearizing feed back path.

9. A saw tooth wave circuit as set forth in claim 1 in which the anode of said driver valve is connected with the cathode of said damping valve.

ALFRED BENJAMIN STARKS-FIELD.

References Cited in the file of this patent

UNITED STATES PATENTS

| Number | Name | Date |
|---|---|---|
| 2,536,853 | Moore | Jan. 2, 1951 |